(12) United States Patent
Okada et al.

(10) Patent No.: US 10,571,012 B2
(45) Date of Patent: Feb. 25, 2020

(54) SUPPORT PART LUBRICATION STRUCTURE FOR GEAR MEMBER, AND DIFFERENTIAL DEVICE

(71) Applicant: MUSASHI SEIMITSU INDUSTRY CO., LTD., Toyohashi-Shi, Aichi (JP)

(72) Inventors: Yasunao Okada, Toyohashi (JP); Kazunori Ochiai, Toyohashi (JP); Syuichi Ishikawa, Toyohashi (JP)

(73) Assignee: Musashi Seimitsu Industry Co., Ltd., Aichi (JP)

( * ) Notice: Subject to any disclaimer, the term of this patent is extended or adjusted under 35 U.S.C. 154(b) by 318 days.

(21) Appl. No.: 15/649,764

(22) Filed: Jul. 14, 2017

(65) Prior Publication Data

US 2018/0023685 A1    Jan. 25, 2018

(30) Foreign Application Priority Data

Jul. 20, 2016    (JP) .................................. 2016-142580

(51) Int. Cl.
*F16H 57/04*    (2010.01)
*F16H 48/08*    (2006.01)

(52) U.S. Cl.
CPC ......... *F16H 57/0428* (2013.01); *F16H 48/08* (2013.01); *F16H 57/0483* (2013.01)

(58) Field of Classification Search
CPC .................... F16H 57/0424; F16H 57/0428
See application file for complete search history.

(56) References Cited

U.S. PATENT DOCUMENTS

| 9,863,519 B2* | 1/2018 | Mori ....................... F16H 48/40 |
| 9,925,868 B2* | 3/2018 | Palazzolo ............ B60K 17/344 |
| 10,288,161 B2* | 5/2019 | Mori ....................... F16H 48/38 |
| 10,309,521 B2* | 6/2019 | Takuno ................ B60K 17/344 |
| 2016/0053883 A1* | 2/2016 | Ichikawa ............ F16H 57/0018 74/467 |

FOREIGN PATENT DOCUMENTS

| JP | H09-49557 A | 2/1997 |
| JP | 2012-149692 A | 8/2012 |

OTHER PUBLICATIONS

Official communication issued in the corresponding Japanese Patent Application No. 2016-142580.
Official communication issued in the corresponding Japanese Patent Application No. 2016-142580 dated Feb. 13, 2019.

* cited by examiner

*Primary Examiner* — Derek D Knight
(74) *Attorney, Agent, or Firm* — Carrier Blackman & Associates, P.C.; William D. Blackman; Joseph P. Carrier (57) ABSTRACT

In a support part lubrication structure for a gear member, in which an oil groove is recessed in either one face of a supported face of the gear member and a support face of a support body that are rotatably slidable relative to each other, the one face is provided with a pair of oil grooves formed from a pair of helical grooves whose helical directions are in opposite directions to each other, and the pair of oil grooves do not intersect each other partway along the oil groove. Accordingly, this enables a screw pump action of the helical oil groove to be exhibited effectively even when a direction of relative rotation of the gear member relative to the support body changes during transmission, thereby enabling parts where the support face and the supported face rotationally slide relative to each other to be efficiently lubricated.

20 Claims, 5 Drawing Sheets

SUPPORT PART LUBRICATION STRUCTURE FOR GEAR MEMBER, AND DIFFERENTIAL DEVICE

CROSS-REFERENCE TO RELATED APPLICATIONS

This application is based upon, and claims the benefit of priority from Japanese Patent Application 2016-142,580, filed on Jul. 20, 2016. The entire disclosure of the referenced priority document, including specification, claims and drawings, is incorporated by reference herein.

BACKGROUND OF THE INVENTION

Field of the Invention

The present invention relates to a support part lubrication structure for a gear member in which an oil groove is recessed in either one face of a support face of a support member and a supported face of the gear member, lubricating oil being capable of flowing in the oil groove, and to a differential device to which the lubrication structure is applied.

Description of the Related Art

As the above support part lubrication structure, for example, an arrangement in which the oil groove is formed from a helical groove is conventionally known (ref. Japanese Patent Application Laid-open No. 9-49557). In the conventional structure, based on the screw pump action of a helical groove accompanying relative rotation between a support face of a differential case (support body) side and a supported face of a differential gear (gear member) side, it is possible to efficiently lubricate parts where the support face and the supported face rotationally slide relative to each other by actively making lubricating oil flow from one end of the oil groove toward the other end.

In the conventional structure, since there is only one helical groove provided in the supported face, there is the problem that said one helical groove can exhibit a screw pump action only when there is rotation in one direction of the differential gear (gear member) corresponding to the helical direction of the groove.

In order to solve this problem, providing two helical grooves facing in opposite directions to each other in the supported face could be considered, but in this case if the two helical grooves facing in opposite directions intersect each other partway along, turbulence will occur in the flow of lubricating oil flowing in one oil groove in the section where they intersect, a smooth screw pump action will be inhibited, and this will thus be a main factor in degradation of the lubrication efficiency.

SUMMARY OF THE INVENTION

The present invention has been accomplished in such circumstances, and it is an object thereof to provide a support part lubrication structure for a gear member that enables a screw pump action of a helical oil groove to be exhibited effectively even when a direction of relative rotation of the gear member relative to a support body changes during transmission, thereby enabling parts where a support face and a supported face rotationally slide relative to each other to be efficiently lubricated, and to provide a differential device.

In order to achieve the object, according to a first aspect of the present invention, there is provided a support part lubrication structure for a gear member, in which the gear member having a gear portion is provided with a supported face, a support face provided on a support body that is relatively rotatable in two directions of forward and reverse with respect to the gear member so as to correspond to the supported face makes contact with the supported face so that the support face and the supported face are rotatably slidable relative to each other, and an oil groove is recessed in either one face of the support face and the supported face, wherein said one face is provided with a pair of oil grooves formed from a pair of helical grooves whose helical directions are in opposite directions to each other, and the pair of oil grooves do not intersect each other partway along the oil groove.

In accordance with the first aspect of the present invention, since either one face of the supported face of the gear member and the support face of the support body, which are rotatably slidable relative to each other, is provided with the pair of oil grooves formed from a pair of helical grooves whose helical directions are in opposite directions to each other, and the pair of oil grooves do not intersect each other partway along the oil groove, even when the rotational direction of the gear member relative to the support body changes during transmission, both of the oil grooves can exhibit a screw pump action effectively, and parts where the support face and the supported face rotationally slide relative to each other can be reliably lubricated with lubricating oil flowing in the oil groove. Moreover, since the pair of oil grooves have a configurational form in which they do not intersect each other partway along even though the helical directions of the two are in opposite directions to each other, the flow of lubricating oil in one oil groove, which is exhibiting a screw pump action, is not subjected to interference from the flow in the other oil groove and the oil can flow smoothly within said one oil groove, thereby enabling the rotationally sliding parts to be efficiently lubricated.

According to a second aspect of the present invention, in addition to the first aspect, the supported face of the gear member is provided so as to face a side opposite to the gear portion in an axial direction, and the support face and the supported face make rotatably slidable contact with each other so that a thrust load can be transmitted therebetween.

In accordance with the second aspect, even when a thrust load acts on the parts where the supported face and the support face, which is the thrust receiving face, rotationally slide relative to each other it is possible to efficiently lubricate the rotationally sliding parts, thus improving the durability of the rotationally sliding parts.

According to a third aspect of the present invention, in addition to the first or second aspect, the gear member has a through hole extending through a central part of the gear member in the axial direction, each oil groove curves so that, when viewed from the axial direction, each oil groove circumvents the through hole in a peripheral direction and an inner end and an outer end of each oil groove are formed so as to sandwich the through hole therebetween.

In accordance with the third aspect, since each oil groove curves so that, when viewed from the axial direction of the gear member, each oil groove circumvents the through hole in the central part of the gear member in the peripheral direction and the inner end and the outer end of each oil groove are formed so as to sandwich the through hole therebetween, it is possible to form the pair of oil grooves so that they are as long as possible while avoiding intersection of the oil grooves with each other. This enables the residence time for oil in each oil groove to be extended, thus enabling the rotationally sliding parts to be lubricated more effectively.

According to a fourth aspect of the present invention, in addition to any one of the first to third aspects, inner ends, opening at the inner peripheral edge of the one face, of the pair of oil grooves are connected to each other.

In accordance with the fourth aspect, since the inner ends, opening on the inner peripheral edge of said one face, of the pair of oil grooves are connected to each other, it becomes possible to form at least the inner end side of the pair of oil grooves so that they are as long as possible while avoiding intersection of the oil grooves with each other. Moreover, for example when lubricating oil that has been drawn in from the outer end side of one oil groove by virtue of the screw pump action of said one oil groove is discharged from the inner end of said one oil groove, part of the discharged oil can be supplied and circulated to the other oil groove, the inner end of which is connected to the inner end of said oil groove, thereby enabling the rotationally sliding parts to be lubricated more effectively.

According to a fifth aspect of the present invention, in addition to any one of the first to third aspects, the pair of oil grooves are disposed symmetrically to each other with respect to an imaginary plane bisecting the gear member along a rotational axis of the gear member.

In accordance with the fifth aspect, since the pair of oil grooves are disposed symmetrically to each other with respect to the imaginary plane bisecting the gear member along the rotational axis of the gear member, it is possible to make the length and the manner of bending of the pair of oil grooves match each other. Therefore, the manner in which lubricating oil flows in the pair of oil grooves (and therefore the screw pump action of the two oil grooves) will not be greatly different from each other in the directions of relative rotation between the gear member and the support body, and it becomes possible to maintain a good lubrication state for the rotationally sliding parts regardless of the direction of relative rotation.

According to a sixth aspect of the present invention, in addition to any one of the first to fourth aspects, the pair of oil grooves are recessed in the supported face, which is a spherical face protruding in the axial direction, and the oil groove is formed so that, when viewed in a cross section transverse to the oil groove, an angle formed between an opening edge, on an outer peripheral side of the supported face, of the oil groove and a tangent of the supported face passing through an intersection point between the opening edge and the supported face increases gradually in going closer to an outer peripheral end of the supported face.

In accordance with the sixth, since the pair of oil grooves are recessed in the supported face, which is a spherical face protruding in the axial direction of the gear member, and the oil groove is formed so that, when viewed in a cross section transverse to the oil groove, the angle formed between the opening edge, on the outer peripheral side of the supported face, of the oil groove and the tangent of the supported face passing through the intersection point between the opening edge and the supported face increases gradually in going closer to the outer peripheral end of the supported face, even if a large centrifugal force acts on the lubricating oil within the oil groove as it gets close to the outer peripheral end of the supported face having a spherical face, it is possible, by gradually increasing the gradient of the opening edge of the oil groove on the outer peripheral side of the supported face as it gets close to the outer peripheral end of the supported face, to suppress as much as possible the amount of oil leaking from the oil groove due to the centrifugal force. This enables the residence time for oil in the oil groove to be extended, thus lubricating the rotationally sliding parts more effectively.

According to a seventh aspect of the present invention, there is provided a differential device to which the support part lubrication structure for a gear member according to any one of the first to sixth aspects is applied, wherein the support body is a differential case, and the gear member is at least one gear of a pair of output gears supported so as to be rotatable around a rotational axis of the differential case and a differential gear that is disposed between the pair of output gears, meshes with the pair of output gears, and is supported on the differential case as to be rotatable around a predetermined axis orthogonal to the rotational axis.

In accordance with the seventh aspect, it is possible to obtain a differential device equipped with a support part lubrication structure for an output gear and/or a differential gear having the above aspects.

In the present invention, the 'spherical face' not only includes a true spherical surface but also a surface of a sphere that is close to a true sphere, such as, for example, an ellipsoid, an ovaloid or the like.

The above and other objects, characteristics and advantages of the present invention will be clear from detailed descriptions of the preferred embodiment which will be provided below while referring to the attached drawings.

DESCRIPTION OF THE PREFERRED EMBODIMENT

An embodiment of the present invention is explained below by reference to the attached drawings.

Figure 1:
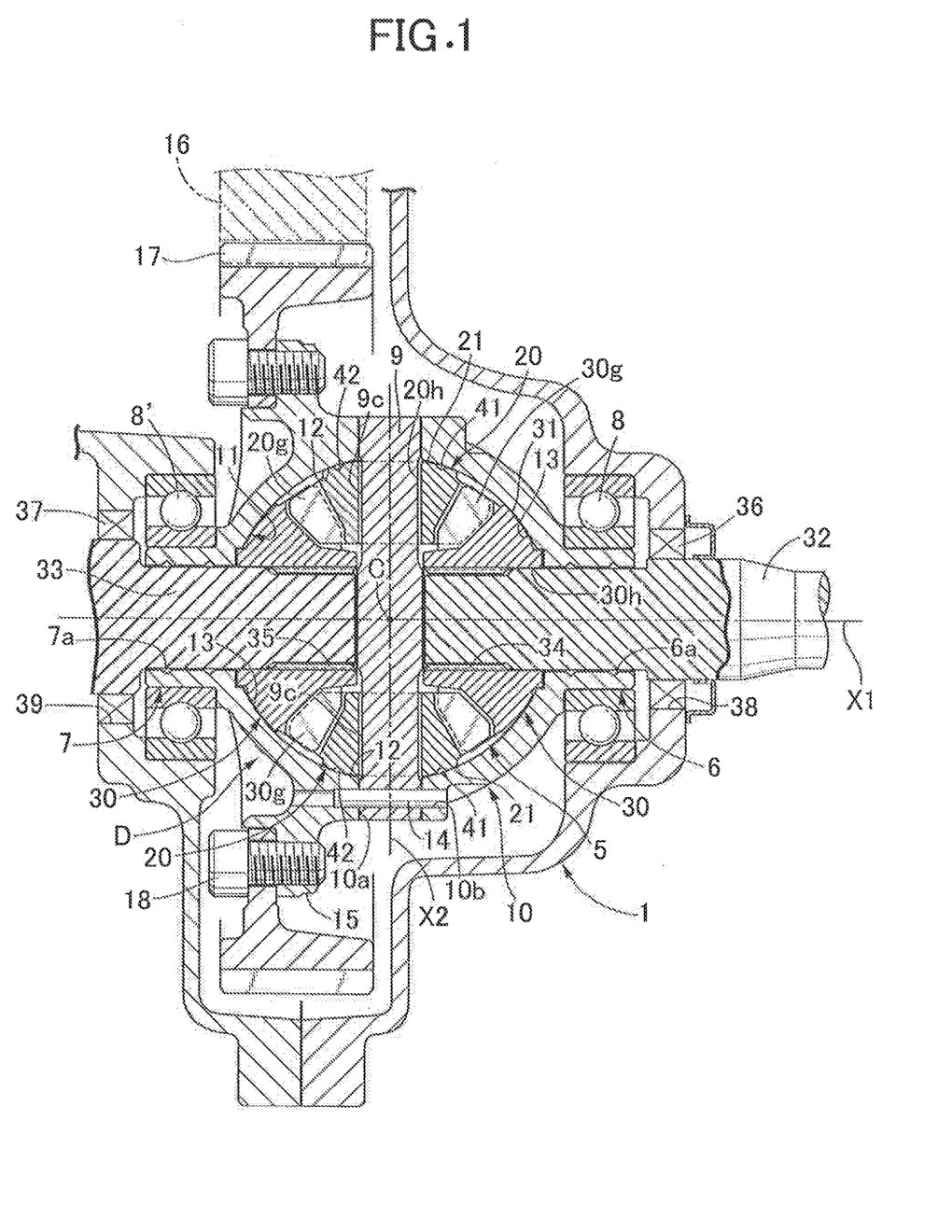
FIG. 1 is a sectional view of an essential part of a differential device related to one embodiment of the present invention.
Figure 2:
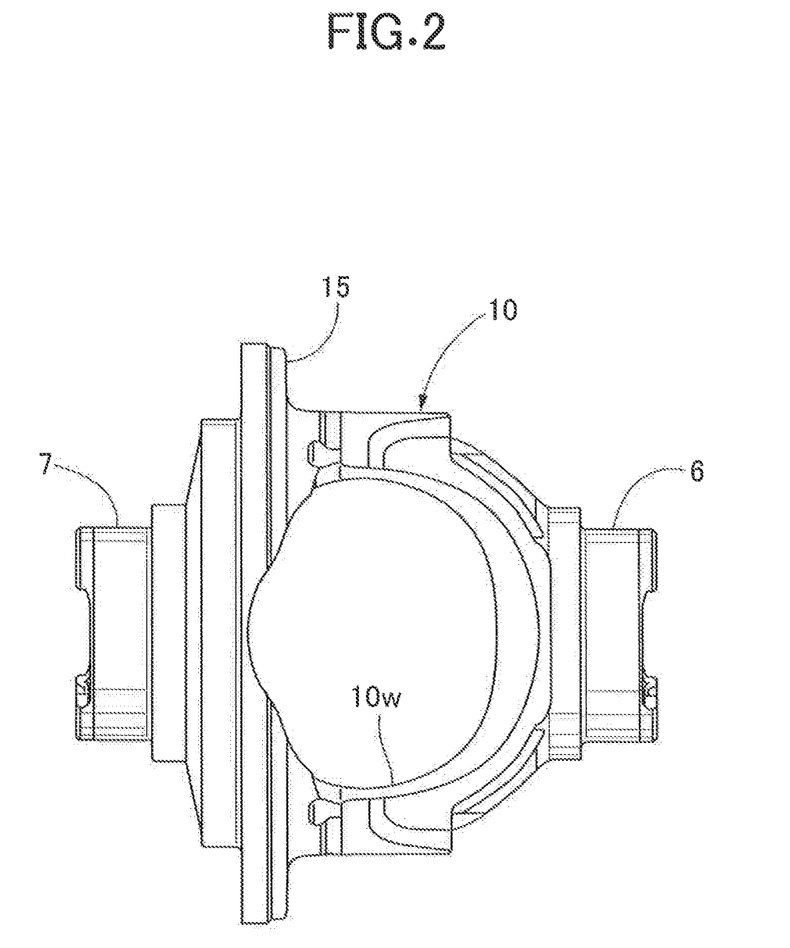
FIG. 2 is a side view showing a differential case in the differential device on its own.

First, in FIG. 1 and FIG. 2, a differential device D is housed within a transmission case 1 of an automobile together with a transmission device, which is not illustrated. The differential device D includes an integral differential case 10 and a differential gear mechanism 5 incorporated into the differential case 10. Formed integrally with a right part and a left part of the differential case 10 are a first boss 6 and a second boss 7 arranged with a gap therebetween on a first axis X1, which is a rotational axis of the differential case 10. The differential case 10 is rotatably supported on the transmission case 1 by the first and second bosses 6 and 7 via bearings 8 and 8'.

An annular flange 15 is formed integrally with the differential case 10 via an intermediate part offset from a center C toward the second boss 7 side, and a ring gear 17 meshing with an output gear 16 of the transmission device, which is connected to a power source, is fastened to the flange 15 by means of a bolt 18. Instead of such bolt fastening, joining by welding may be employed, or alternatively a ring gear may be formed integrally with the differential case 10.

The differential gear mechanism 5 includes a pinion shaft 9 that is retained by the differential case 10 so as to be on a second axis X2 orthogonal to the first axis X1 and passes through the center C of the differential case 10, a pair of pinion gears 20 that are supported so as to be rotatable around the second axis X2 of the pinion shaft 9, and a pair of side gears 30 that are disposed so as to sandwich each of the pinion gears 20 and mesh with each of the pinion gears 20. Both the pinion gear 20 and the side gear 30 are formed from a bevel gear and are incorporated into the differential case 10 together with the pinion shaft 9.

The pinion gear 20 includes in a central part a through hole 20h through which the pinion shaft 9 is relatively rotatably fitted, and a shallow cutout face 9c is recessed in an outer peripheral face of the pinion shaft 9 so as to correspond to the through hole 20h. A flattened oil passage is defined between the cutout face 9c and the through hole 20h, the flattened oil passage guiding lubricating oil on the outer peripheral face of the pinion shaft 9 outward in the axial direction (that is, toward parts where a supported face 21 and a support face 12, which are described later, rotationally slide relative to each other).

With regard to the pinion shaft 9, opposite end parts thereof are removably fitted into a pair of support holes 10a provided in a peripheral wall of the differential case 10. Press fitting a retaining pin 14 extending through one end part of the pinion shaft 9 into a mounting hole 10b provided in the differential case 10 so as to traverse one support hole 10a fixes the pinion shaft 9 to the differential case 10. As fixing means, fixing means other than press fitting (for example, welding, screwing, etc.) may be employed.

The pair of side gears 30 are supported on the differential case 10 so as to be rotatable around the first axis X1 via first and second drive shafts 32 and 33 fitted into and supported on the first and second bosses 6 and 7 of the differential case 10. That is, the outer periphery of an intermediate part of the first and second drive shafts 32 and 33 is rotatably fitted into and supported by inner peripheral parts of the first and second bosses 6 and 7, and spline fittings 34 and 35 of the outer periphery of inner end parts of the first and second drive shafts 32 and 33 are made in a through hole 30h provided in a central part of the pair of side gears 30. The outer end sides of the first and second drive shafts 32 and 33 are operatively linked to left and right axles, which are not illustrated.

The first and second drive shafts 32 and 33 are inserted into the transmission case 1 through a pair of through holes 38 and 39 provided in the transmission case 1, and annular seal members 36 and 37 are disposed between inner faces of the through holes 38 and 39 and the first and second drive shafts 32 and 33, the seal members 36 and 37 sealing gaps therebetween. Helical grooves 6a and 7a are formed in at least one of mating faces between the first and second bosses 6 and 7 and the first and second drive shafts 32 and 33 (inner peripheral faces of the first and second bosses 6 and 7 in this embodiment), and the helical grooves 6a and 7a can draw in lubricating oil to the interior of the transmission case 1 by exhibiting a screw pump action accompanying relative rotation between one and the other of the mating faces when the automobile is traveling forward.

In this embodiment, the pair of side gears 30 are rotatably supported on the differential case 10 via the first and second drive shafts 32 and 33, but for example a boss projectingly provided integrally with back faces of the pair of side gears 30 may be rotatably fitted and supported directly on the differential case 10 (that is, without use of the drive shafts 32 and 33).

The rotational driving force of the power source (transmission device) inputted into the differential case 10 is transmitted to the pair of side gears 30 via the pinion shaft 9 and the pinion gear 20 and further to the first and second drive shafts 32 and 33. The drive shafts 32 and 33 are thereby rotated while allowing differential rotation.

A thrust support part structure and a support part lubrication structure of the pinion gear 20 and the side gear 30 by means of the differential case 10 are now explained specifically by referring in addition to FIG. 3 and FIGS. 4A to 4C.

The pinion gear 20 integrally has a gear portion 20g whose tooth face is directed toward one side in the axial direction, and the supported face 21 is formed on the other side in the axial direction of the pinion gear 20, the supported face 21 protruding spherically while facing said other side (that is, the side opposite to the gear portion 20g in the axial direction). On the other hand, the side gear 30 integrally has a gear portion 30g whose tooth face is directed toward one side in the axial direction so as to mesh with the gear portion 20g of the pinion gear 20, and a supported face 31 is formed on the other side in the axial direction of the side gear 30, the supported face 31 protruding spherically while facing said other side (that is, the side opposite to the gear portion 30g in the axial direction).

The supported faces 21 and 31 of the pinion gear 20 and the side gear 30 are rotatably and slidably in contact with and supported on the first and second support faces 12 and 13 of the differential case 10 as described below so that a thrust load can be transmitted therebetween. That is, an inner face of the differential case 10 forms a spherical concave support face 11 with the center C of the differential case 10 as the center. The support face 11 includes an annular first region forming the first support face 12, with which the supported face 21 of the pinion gear 20 is rotatably and slidably in contact, and an annular second region forming the second support face 13, with which the supported face 31 of the side gear 30 is rotatably and slidably in contact.

Figure 3:
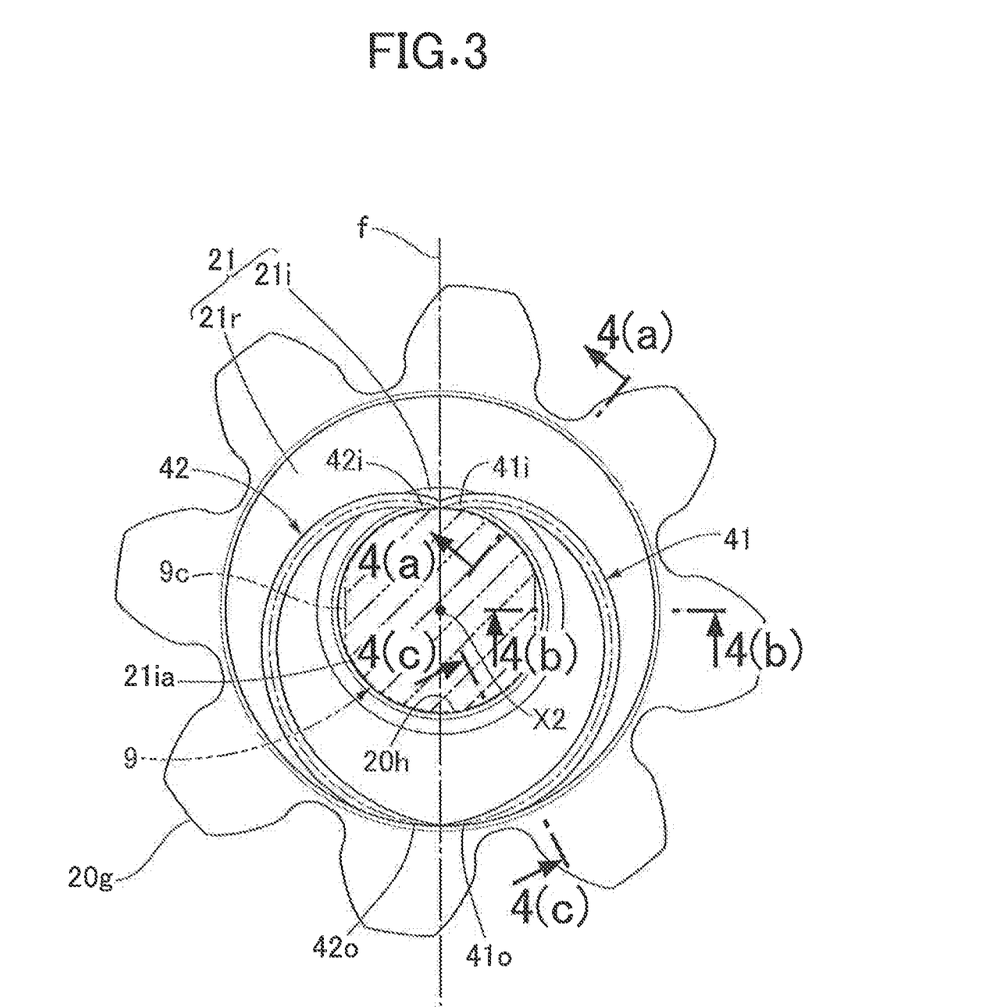
FIG. 3 is a rear view showing a pinion gear in the differential device on its own.

Recessed in the supported face 21 of the pinion gear 20 of the present embodiment are first and second oil grooves 41 and 42 having opposite ends thereof opening at one end edge in the width direction (that is, the inner peripheral edge) and the other end edge (that is, the outer peripheral edge) of the supported face 21. The first and second oil grooves 41 and 42 are formed from a pair of helical grooves whose helical directions are in opposite directions to each other, and the two oil grooves 41 and 42 are provided in the supported face 21 so that they do not intersect each other partway along.

Furthermore, the first and second oil grooves 41 and 42 are formed in a configuration in which, as clearly shown in FIG. 3, when viewed in the axial direction the two oil grooves 41 and 42 curve so as to each circumvent the through hole 20h in the peripheral direction and the through hole 20h is sandwiched between inner ends 41i and 42i and outer ends 41o and 42o, opening at the inner peripheral edge and the outer peripheral edge respectively of the supported face 21, of the two oil grooves 41 and 42. Moreover, the inner ends 41i and 42i of the first and second oil grooves 41 and 42 are connected to each other via the inner peripheral edge of the supported face 21, and the outer ends 41o and 42o are connected to each other via the outer peripheral edge of the supported face 21.

Moreover, as is clearly shown in FIG. 3 the first and second oil grooves 41 and 42 are disposed symmetrically to each other with respect to an imaginary plane f bisecting the pinion gear 20 along the second axis X2.

The supported face 21 of the pinion gear 20 of the present embodiment, as is also clear from FIG. 3 and FIGS. 4A to 4C, is formed so that a region 21r, which is the majority of the supported face 21 excluding an inner peripheral end portion 21i, is a spherical face having a uniform curvature for each section. The above inner peripheral end portion 21i is formed as a plane orthogonal to the second axis X2 and, for example, a tapered chamfer 21ia is formed on the inner peripheral edge of the inner peripheral end portion 21i. The inner ends 41i and 42i of the first and second oil grooves 41 and 42 are connected to each other at the inner peripheral end portion 21i of the supported face 21 and communicate directly with each other. Another embodiment (not illustrated) in which substantially the entire region of the supported face 21 including the inner peripheral end portion 21i is formed into a spherical face is also possible.

Figure 4A:
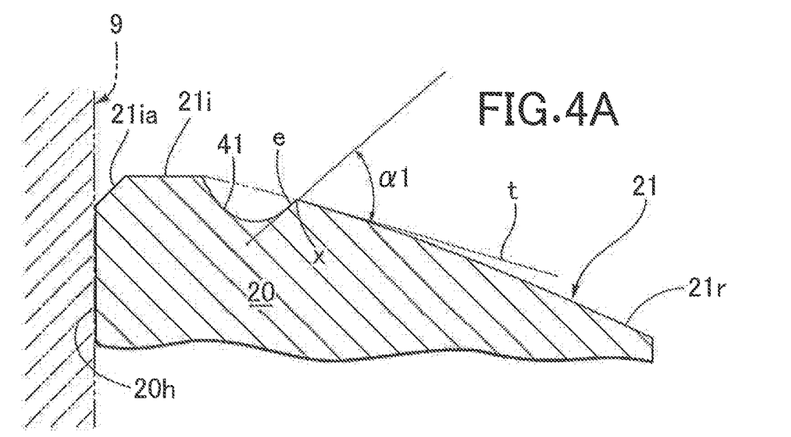
FIGS. 4A to 4C are sectional views of the pinion gear when an oil groove provided in a supported face of the pinion gear is viewed in the transverse direction at three positions partway along the oil groove, FIG. 4A a sectional view along line 4(a)-4(a) in FIG. 3, FIG. 4B a sectional view along line 4(b)-4(b) in FIG. 3, FIG. 4C a sectional view along line 4(c)-4(c) in FIG. 3.
Figure 4B:
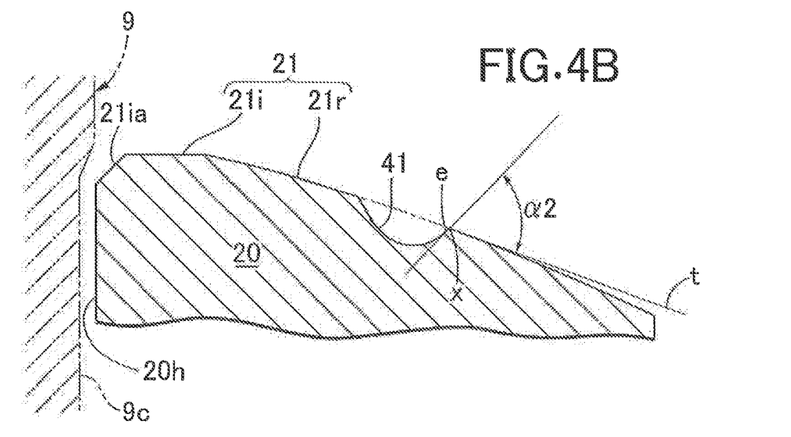
Figure 4C:
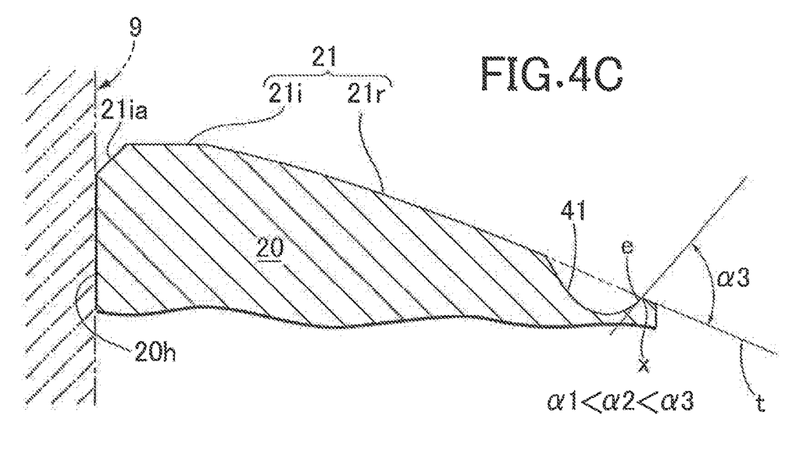

Furthermore, the first and second oil grooves 41 and 42 of the present embodiment, as is clearly shown in FIGS. 4A to 4C, are formed by for example machining so that when viewed in a cross section transverse to the first and second oil grooves 41 and 42, an angle α formed between an opening edge e, on the outer peripheral side of the supported face 21, of the first and second oil grooves 41 and 42 and a tangent t of the supported face 21 passing through an intersection point x between the opening edge e and the supported face 21 increases gradually ($\alpha 1 < \alpha 2 < \alpha 3$) in going toward an outer peripheral end of the supported face 21 (that is, in FIGS. 4A to 4C the right end of the spherical region 21r). FIGS. 4A to 4C only illustrates the cross sectional shape of the first oil groove 41, but the cross sectional shape of the second oil groove 42 is the same.

Furthermore, a pair of access windows 10w are provided in a peripheral wall of the differential case 10 symmetrically with respect to the center C of the differential case 10, the access windows 10w allowing an operation of machining the spherical support face 11 of the differential case 10 and an operation of incorporating the differential gear mechanism 5 into the differential case 10. FIG. 2 shows only one access window 10w.

In the present embodiment explained above, the differential case 10 forms the support body of the present invention, the pinion gear 20 forms the gear member and the differential gear of the present invention, and the side gear 30 forms the output gear of the present invention.

The operation of the embodiment is now explained. When assembling the differential device D, first the pinion gear 20 is inserted into the differential case 10 through the access window 10w, the pinion shaft 9 is fitted through the pinion gear 20 and the support hole 10a of the differential case 10, and the pinion shaft 9 is fixed to the differential case 10 by means of the retaining pin 14. Subsequently, the side gear 30 is inserted into the differential case 10 through the access window 10w.

The differential device D thus assembled is incorporated into the transmission case 1, following this the first and second drive shafts 32 and 33 are inserted into the transmission case 1 through the through holes 38 and 39 of the transmission case 1, spline fittings 34 and 35 of the inner end parts of the two drive shafts 32 and 33 are made in the through hole 30h of the pair of side gears 30, and the gaps between the inner faces of the through holes 38 and 39 and the first and second drive shafts 32 and 33 are sealed with the annular seal members 36 and 37.

Subsequently, when lubricating oil is poured into the transmission case 1, part thereof can flow to the interior of the differential case 10 through the access window 10w. In a state in which the differential device D is operating, it is used for lubrication of each section of the differential gear mechanism 5 (for example, sections via which the gear portions 20g and 30g of the pinion gear 20 and the side gear 30 are meshed with each other, parts where the supported faces 21 and 31 of the pinion gear 20 and the side gear 30 and the support faces 12 and 13 of the differential case 10 side rotationally slide relative to each other, etc.).

More specifically, while the automobile is traveling forward, part of the lubricating oil scattered within the transmission case 1 accompanying rotation of the differential case 10 and another movable member is drawn into the interior of the differential case 10 through the helical grooves 6a and 7a, which exhibit a screw pump action accompanying relative rotation of mating faces for example between the first and second bosses 6 and 7 and the first and second drive shafts 32 and 33. With regard to the lubricating oil thus drawn in, for example, part thereof reaches and accumulates in a part where the gear portions 30g and 20g mesh with each other via the parts where the supported face 31 and the support face 13 rotationally slide relative to each other on the side gear 30 side and, furthermore, reaches and accumulates in an area around the outer peripheral edge of the supported face 21 of the pinion gear 20. The rest of the lubricating oil drawn in reaches and accumulates in for example the outer peripheral part of the pinion shaft 9 through the spline fitting parts 34 and 35 and, furthermore, reaches and accumulates in an area around the inner peripheral edge of the supported face 21 of the pinion gear 20 via a part where the pinion shaft 9 and the pinion gear 20 (the through hole 20h) are fitted together.

Furthermore, it is possible to supply lubricating oil to an area around the inner and outer peripheral edges of the supported face 21 of the pinion gear 20 even with a lubricating oil path that does not go through the lubrication grooves 6a and 7a; for example, lubricating oil is supplied directly to the interior of the differential case 10, for example, a part where the gear portions 30g and 20g are meshed with each other, the outer peripheral part of the pinion shaft 9, etc. through the access window 10w of the peripheral wall of the differential case 10, and it is possible to supply lubricating oil therefrom to an area around the inner and outer peripheral edges of the supported face 21.

The first and second oil grooves 41 and 42, which are a pair of helical grooves whose helical directions are in opposite directions to each other, are provided in the supported face 21 of the pinion gear 20 of the present embodiment so as not to intersect each other partway along the two oil grooves 41 and 42, and when the pinion gear 20 rotates relative to the differential case 10 accompanying operation of the differential gear mechanism 5, both of the oil grooves 41 and 42 can exhibit a screw pump action. For example, lubricating oil that has reached to and resides in the area around the inner peripheral edge of the supported face 21 via the above lubricating oil path is drawn into the interior of the groove via the inner end 41i (42i) of one oil groove 41 (42) opening at the inner peripheral edge and is discharged outside the groove via the outer end 41o (42o) of said one oil groove 41 (42), and partway therealong part of the oil is supplied to the parts where the supported face 21 and the support face 12 rotationally slide relative to each other.

Furthermore, lubricating oil that has reached to and resides in the area around the outer peripheral edge of the supported face 21 via the above lubricating oil path is drawn into the interior of the groove via the outer end 42o (41o) of the other oil groove 42 (41) opening at the outer peripheral edge and is discharged outside the groove via the inner end 42i (41i) of said other oil groove 42 (41), and partway therealong part of the oil is supplied to the rotationally sliding parts.

Figure 5:
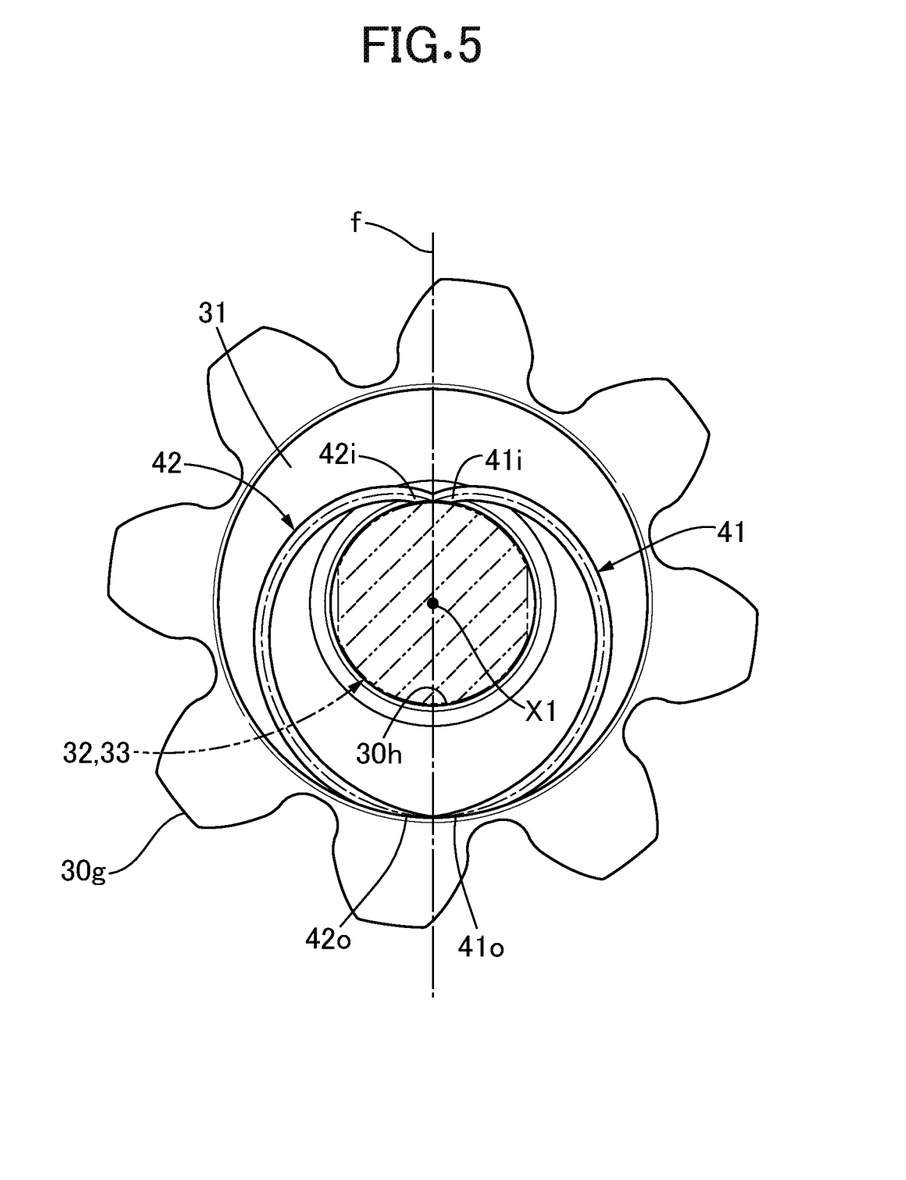
FIG. 5 is an end view of a side gear (output gear) of the differential device in a modified embodiment, with the side gear shown isolated from the differential case and with a drive shaft, which extends through the side gear, shown in cross section.

In this way, even when the rotational direction of the pinion gear 20 relative to the differential case 10 changes accompanying operation of the differential gear mechanism 5, since both of the first and second oil grooves 41 and 42, whose helical directions are in opposite directions to each other, can exhibit a screw pump action effectively, it is possible to reliably lubricate the parts where the supported face 21 and the support face 12 rotationally slide relative to each other with lubricating oil flowing through each of the oil grooves 41 and 42. Therefore, even when a large thrust load acts on the rotationally sliding parts due to a meshing reaction force between the pinion gear 20 and the side gear 30, etc., it is possible to efficiently lubricate the rotationally sliding parts, thus improving the durability of the rotationally sliding parts. It will be seen from FIG. 5 that a similar arrangement of oil grooves 41, 42 may be formed in a supported face 31 of one or both of the output gears 30.

Furthermore, since the first and second oil grooves 41 and 42 have a configurational form in which they do not intersect each other partway along even though the helical directions of the two are in opposite directions to each other, the flow of lubricating oil in one oil groove 41 (42), which is exhibiting a screw pump action, is not subjected to interference from the flow in the other oil groove 42 (41) and the oil can flow smoothly within said one oil groove 41 (42), thereby enabling the rotationally sliding parts to be efficiently lubricated.

Moreover, in the present embodiment, when viewed in the axial direction of the pinion gear 20, the first and second oil grooves 41 and 42 as shown in FIG. 3 curve such that the oil grooves 41 and 42 each circumvent the through hole 20h in the center of the pinion gear 20 in the peripheral direction, and the inner ends 41i and 42i and the outer ends 41o and 42o, opening at the inner peripheral edge and the outer peripheral edge respectively of the supported face 21, of the oil grooves 41 and 42 are formed so as to sandwich the through hole 20h therebetween. This enables the first and second oil grooves 41 and 42 to be formed so that they are as long as possible while avoiding intersection between the oil grooves 41 and 42, and it is therefore possible to extend the residence time for oil in the oil grooves 41 and 42, thereby enabling the rotationally sliding parts to be lubricated more effectively.

Furthermore, in the present embodiment, since the inner ends 41i and 42i, opening at the inner peripheral edge of the supported face 21, of the first and second oil grooves 41 and 42 are connected to each other, it is possible to form the parts close to the inner ends of the two oil grooves 41 and 42 so that they are as long as possible while avoiding intersection between the oil grooves 41 and 42. Moreover, since the outer ends 41o and 42o, opening at the outer peripheral edge of the supported face 21, of the first and second oil grooves 41 and 42 are connected to each other, it is possible to form the parts close to the outer ends of the two oil grooves 41 and 42 so that they are as long as possible while avoiding intersection between the oil grooves 41 and 42. Furthermore, for example, when lubricating oil that has been drawn in from the outer end 41o (42o) side of one oil groove 41 (42) due to the screw pump action of said one oil groove 41 (42) is discharged outside the groove via the inner end 41i (42i) of said one oil groove 41 (42), it becomes possible to supply and circulate part of the discharged lubricating oil to the other oil groove 42 (41), to the inner end of which the inner end of said one oil groove 41 (42) is connected. This enables the rotationally sliding parts to be lubricated more effectively.

Moreover, since as shown in FIG. 3 the first and second oil grooves 41 and 42 of the present embodiment are disposed symmetrically to each other with respect to the imaginary plane f bisecting the pinion gear 20 along the second axis X2, which is the rotational axis of the pinion gear 20, it is possible to make the length and the manner of bending of the two oil grooves 41 and 42 match each other. Owing to this, the manner in which lubricating oil flows in the two oil grooves 41 and 42 (and therefore the screw pump action of the two oil grooves 41 and 42) will not be greatly different from each other in the directions of relative rotation between the pinion gear 20 and the differential case 10, and it becomes possible to maintain a good lubrication state for the rotationally sliding parts regardless of the direction of relative rotation.

Furthermore, the first and second oil grooves 41 and 42 of the present embodiment are recessed in the supported face 21, which is a spherical face protruding outward in the axial direction, of the pinion gear 20, and the oil grooves 41 and 42 are formed so that when viewed in a cross section transverse to the oil grooves 41 and 42, the angle α formed between the opening edge e, on the outer peripheral side of the supported face 21, of the oil grooves 41 and 42 and the tangent t of the supported face 21 passing through the intersection point x between the opening edge e and the supported face 21 increases gradually in going toward the outer peripheral end of the supported face 21 (that is, the right end of the spherical region 21r in FIGS. 4A to 4C). This point is obvious since the angle α, as shown in FIG. 3 and FIGS. 4A to 4C, increases gradually as the angle α of the oil groove 41 gets closer to the outer peripheral end of the spherical region 21r (that is, α1<α2<α3).

Therefore, even if a large centrifugal force acts on the lubricating oil within the oil grooves 41 and 42 as it gets close to the outer peripheral end of the supported face 21 having the spherical face region 21r as a main part, it is possible, by gradually increasing the gradient of the opening edge e of the oil grooves 41 and 42 on the outer peripheral side of the supported face 21 as it gets close to the outer peripheral end of the supported face 21, to suppress as much as possible the amount of oil leaking from the oil grooves 41 and 42 due to the centrifugal force. This enables the residence time for oil in the oil grooves 41 and 42 to be extended, thus lubricating the rotationally sliding parts more effectively.

An embodiment of the present invention is explained above, but the present invention is not limited to the above-mentioned embodiment and may be modified in a variety of ways as long as the modifications do not depart from the gist of the present invention.

For example, in the embodiment, the differential device D is housed within the transmission case 1 of the automobile; the differential device D is not limited to a differential device for an automobile, and it can be implemented as a differential device for various types of mechanical device. Furthermore, the embodiment shows an arrangement in which the differential device D is applied to a left and right wheel transmission system, and the power is distributed between the left and right drive shafts while allowing differential rotation, but in the present invention the differential device may be applied to a front and rear wheel transmission system in a front and rear wheel drive vehicle, and the power may be distributed between front and rear driven wheels while allowing differential rotation.

Moreover, the embodiment shows an arrangement in which the pair of pinion gears 20 are rotatably supported on the differential case 10 via the single pinion shaft 9, which is a separate body from the pinion gear 20, but three or more pinion gears 20 may be rotatably supported on a differential case via a pinion shaft extending radially from a central part of the differential case, or alternatively a pinion gear may be formed integrally with a pinion shaft part, and the pinion shaft part may be rotatably supported on the differential case.

Furthermore, the embodiment shows the integral differential case 10 equipped with the access window 10*w* as a differential case as a support body, but in the present invention the differential case may be dividedly formed from a plurality of case elements (e.g. first and second case half bodies) fastened to each other by fastening means such as a bolt and the like.

Moreover, the embodiment shows an arrangement in which the pair of oil grooves 41 and 42, which are the helical grooves of the present invention, are provided in the supported face 21 of the pinion gear 20 (differential gear) as the gear member in the differential device D, but the pair of oil grooves 41 and 42 formed from the helical grooves may be provided in the first support face 12 of the differential case 10 as the support body. Alternatively, the pair of oil grooves 41 and 42 formed from a helical groove having the same form as in the embodiment may be provided in the supported face 31 of the side gear 30 (output gear) as the gear member of the differential device D or in the second support face 13 of the differential case 10 rotatably and slidably in contact with the supported face 31, or alternatively they may be provided in a supported face of a gear member of various types of transmission devices other than a differential device or in a support face of a support body rotatably and slidably in contact with the supported face.

Furthermore, the embodiment shows an arrangement in which the supported face 21 of the pinion gear 20 as the gear member is formed as a spherical face protruding toward the side opposite to the gear portion 20*g* in the axial direction, but instead of forming the supported face 21 as a spherical face, it may be formed as a tapered face facing toward the side opposite to the gear portion 20*g* in the axial direction, or alternatively it may be formed in a plane orthogonal to the second axis X2, which is the rotational axis of the pinion gear 20 as the gear member, and in this case the first and second oil grooves 41 and 42 are formed as helical shapes in opposite directions, that is, spiral shapes in opposite directions, in the supported face 21 formed in the plane shape as above.

Moreover, the embodiment shows an arrangement in which the inner ends 41*i* and 42*i* of the first and second oil grooves 41 and 42 open at the inner peripheral edge of the supported face 21 and are connected to each other, and the outer ends 41*o* and 42*o* open at the outer peripheral edge of the supported face 21 and are connected to each other, but the present invention can be implemented as a structure in which the inner ends 41*i* and 42*i* of the first and second oil grooves 41 and 42 are not connected to each other via the inner peripheral edge of the supported face 21 (that is, they open with a gap therebetween in the peripheral direction) or as a structure in which the outer ends 41*o* and 42*o* of the first and second oil grooves 41 and 42 are not connected to each other via the outer peripheral edge of the supported face 21 (that is, they open with a gap therebetween in the peripheral direction). Furthermore, it may be implemented as a structure in which the outer ends 41*o* and 42*o* of the first and second oil grooves 41 and 42 do not open at the outer peripheral edge of the supported face 21 but the inner ends 41*i* and 42*i* open at the inner peripheral edge of the supported face 21 or conversely as a structure in which the inner ends 41*i* and 42*i* of the first and second oil grooves 41 and 42 do not open at the inner peripheral edge of the supported face 21 but the outer ends 41*o* and 42*o* open at the outer peripheral edge of the supported face 21.

Furthermore, the embodiment shows an arrangement in which the supported face 21 on the gear member side and the support face 12 on the support body side are thrust transmission faces that can transmit a thrust load therebetween as in the embodiment, but other than the embodiment the first aspect of the present invention can be applied to an arrangement in which the supported face on the gear member side and the support face on the support body side are cylindrical faces (that is, bearing faces) having as a central axis the second axis X2, which is the rotational axis of the gear member, and in this case a pair of oil grooves formed from the same helical groove as in the embodiment are provided in a supported face or a support face formed from the above cylindrical face.

Moreover, the embodiment shows an arrangement in which the pinion gear 20 as the differential gear and the side gear 30 as the output gear are formed from bevel gears, but in the present invention the pinion gear 20 and the side gear 30 may be formed from a gear other than a bevel gear, for example, a helical gear.

What is claimed is:

1. A support part lubrication structure for a gear member, in which the gear member having a gear portion is provided with a supported face, a support face provided on a support body that is relatively rotatable in two directions of forward and reverse with respect to the gear member so as to correspond to the supported face makes contact with the supported face so that the support face and the supported face are rotatably slidable relative to each other, and oil grooves are recessed in either one face of the support face and the supported face,
   wherein said one face is provided, as said oil grooves, with a pair of oil grooves formed helical, whose helical directions are in opposite directions to each other, and the pair of oil grooves do not intersect each other.

2. The support part lubrication structure for a gear member according to claim 1, wherein the supported face of the gear member is provided so as to face a side opposite to the gear portion in an axial direction, and the support face and the supported face make rotatably slidable contact with each other so that a thrust load can be transmitted therebetween.

3. The support part lubrication structure for a gear member according to claim 2, wherein the gear member has a through hole extending through a central part of the gear member in the axial direction,
   each oil groove curves so that, when viewed from the axial direction, each oil groove circumvents the through hole in a peripheral direction and an inner end and an outer end of each oil groove are formed so as to sandwich the through hole therebetween.

4. The support part lubrication structure for a gear member according to claim 3, wherein inner ends, opening at an inner peripheral edge of the one face, of the pair of oil grooves are connected to each other.

5. The support part lubrication structure for a gear member according to claim 4, wherein the pair of oil grooves are recessed in the supported face, which is a spherical face protruding in the axial direction, and
  each of the oil grooves is formed so that, when viewed in a cross section transverse to the oil groove, an angle formed between an opening edge, on an outer peripheral side of the supported face, of the oil groove and a tangent of the supported face passing through an intersection point between the opening edge and the supported face increases gradually in going closer to an outer peripheral end of the supported face.

6. The support part lubrication structure for a gear member according to claim 3, wherein the pair of oil grooves are recessed in the supported face, which is a spherical face protruding in the axial direction, and
  each of the oil grooves is formed so that, when viewed in a cross section transverse to the oil groove, an angle formed between an opening edge, on an outer peripheral side of the supported face, of the oil groove and a tangent of the supported face passing through an intersection point between the opening edge and the supported face increases gradually in going closer to an outer peripheral end of the supported face.

7. The support part lubrication structure for a gear member according to claim 2, wherein inner ends, opening at an inner peripheral edge of the one face, of the pair of oil grooves are connected to each other.

8. The support part lubrication structure for a gear member according to claim 7, wherein the pair of oil grooves are recessed in the supported face, which is a spherical face protruding in the axial direction, and
  each of the oil grooves is formed so that, when viewed in a cross section transverse to the oil groove, an angle formed between an opening edge, on an outer peripheral side of the supported face, of the oil groove and a tangent of the supported face passing through an intersection point between the opening edge and the supported face increases gradually in going closer to an outer peripheral end of the supported face.

9. The support part lubrication structure for a gear member according to claim 2, wherein the pair of oil grooves are recessed in the supported face, which is a spherical face protruding in the axial direction, and
  each of the oil grooves is formed so that, when viewed in a cross section transverse to the oil groove, an angle formed between an opening edge, on an outer peripheral side of the supported face, of the oil groove and a tangent of the supported face passing through an intersection point between the opening edge and the supported face increases gradually in going closer to an outer peripheral end of the supported face.

10. The support part lubrication structure for a gear member according claim 2, wherein the pair of oil grooves are disposed symmetrically to each other with respect to an imaginary plane bisecting the gear member along a rotational axis of the gear member.

11. The support part lubrication structure for a gear member according to claim 1, wherein the gear member has a through hole extending through a central part of the gear member in an axial direction,
  each oil groove curves so that, when viewed from the axial direction, each oil groove circumvents the through hole in a peripheral direction, and an inner end and an outer end of each oil groove are formed so as to sandwich the through hole therebetween.

12. The support part lubrication structure for a gear member according to claim 11, wherein inner ends, opening at an inner peripheral edge of the one face, of the pair of oil grooves are connected to each other.

13. The support part lubrication structure for a gear member according to claim 12, wherein the pair of oil grooves are recessed in the supported face, which is a spherical face protruding in the axial direction, and
  each of the oil grooves is formed so that, when viewed in a cross section transverse to the oil groove, an angle formed between an opening edge, on an outer peripheral side of the supported face, of the oil groove and a tangent of the supported face passing through an intersection point between the opening edge and the supported face increases gradually in going closer to an outer peripheral end of the supported face.

14. The support part lubrication structure for a gear member according to claim 11, wherein the pair of oil grooves are recessed in the supported face, which is a spherical face protruding in the axial direction, and
  each of the oil grooves is formed so that, when viewed in a cross section transverse to the oil groove, an angle formed between an opening edge, on an outer peripheral side of the supported face, of the oil groove and a tangent of the supported face passing through an intersection point between the opening edge and the supported face increases gradually in going closer to an outer peripheral end of the supported face.

15. The support part lubrication structure for a gear member according claim 11, wherein the pair of oil grooves are disposed symmetrically to each other with respect to an imaginary plane bisecting the gear member along a rotational axis of the gear member.

16. The support part lubrication structure for a gear member according to claim 1, wherein inner ends, opening at an inner peripheral edge of the one face, of the pair of oil grooves are connected to each other.

17. The support part lubrication structure for a gear member according to claim 16, wherein the pair of oil grooves are recessed in the supported face, which is a spherical face protruding in an axial direction, and
  each of the oil grooves is formed so that, when viewed in a cross section transverse to the oil groove, an angle formed between an opening edge, on an outer peripheral side of the supported face, of the oil groove and a tangent of the supported face passing through an intersection point between the opening edge and the supported face increases gradually in going closer to an outer peripheral end of the supported face.

18. The support part lubrication structure for a gear member according to claim 1, wherein the pair of oil grooves are recessed in the supported face, which is a spherical face protruding in an axial direction, and
  each of the oil grooves is formed so that, when viewed in a cross section transverse to the oil groove, an angle formed between an opening edge, on an outer peripheral side of the supported face, of the oil groove and a tangent of the supported face passing through an intersection point between the opening edge and the supported face increases gradually in going closer to an outer peripheral end of the supported face.

19. The support part lubrication structure for a gear member according claim 1, wherein the pair of oil grooves are disposed symmetrically to each other with respect to an imaginary plane bisecting the gear member along a rotational axis of the gear member.

20. A differential device to which the support part lubrication structure for a gear member according to claim 1 is applied, wherein the support body is a differential case, and the gear member is at least one gear of a pair of output gears supported so as to be rotatable around a rotational axis of the differential case and a differential gear that is disposed between the pair of output gears, meshes with the pair of output gears, and is supported on the differential case as to be rotatable around a predetermined axis orthogonal to the rotational axis.

* * * * *